United States Patent
Kobayashi et al.

(10) Patent No.: US 10,647,104 B2
(45) Date of Patent: May 12, 2020

(54) MATERIAL FEEDING DEVICE, ADDITIVE MANUFACTURING APPARATUS, AND MATERIAL SUPPLYING METHOD

(71) Applicant: Kabushiki Kaisha Toshiba, Minato-ku (JP)

(72) Inventors: Kotaro Kobayashi, Mie (JP); Hideshi Nakano, Yokosuka (JP); Hiroshi Ohno, Yokohama (JP); Shanying Pan, Yokohama (JP); Masayuki Tanaka, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 368 days.

(21) Appl. No.: 15/509,431

(22) PCT Filed: Mar. 13, 2015

(86) PCT No.: PCT/JP2015/057595
§ 371 (c)(1),
(2) Date: Mar. 7, 2017

(87) PCT Pub. No.: WO2016/042807
PCT Pub. Date: Mar. 24, 2016

(65) Prior Publication Data
US 2017/0274602 A1    Sep. 28, 2017

(30) Foreign Application Priority Data
Sep. 17, 2014 (JP) .................................. 2014-189304

(51) Int. Cl.
*B33Y 30/00* (2015.01)
*B29C 64/307* (2017.01)
(Continued)

(52) U.S. Cl.
CPC ............ *B33Y 30/00* (2014.12); *B22F 3/1055* (2013.01); *B29C 64/153* (2017.08);
(Continued)

(58) Field of Classification Search
CPC ... B29C 64/307; B29C 64/209; B29C 64/188; B29C 67/00; B29C 64/236;
(Continued)

(56) References Cited

U.S. PATENT DOCUMENTS 2,778,946 A * 1/1957 Mayo ................. G03G 15/0291
250/325
5,252,264 A * 10/1993 Forderhase ............. B22F 3/004
156/272.8
(Continued)

FOREIGN PATENT DOCUMENTS

JP        2002-347129 A    12/2002
JP        2003-53849 A     2/2003
(Continued)

OTHER PUBLICATIONS

International Search Report dated May 26, 2015 in PCT/JP2015/057595 filed Mar. 13, 2015.

*Primary Examiner* — Michael M. Robinson
(74) *Attorney, Agent, or Firm* — Oblon, McClelland, Maier & Neustadt, L.L.P.

(57) ABSTRACT

According to one embodiment, a material feeding device includes a feeding unit. The feeding unit includes an electrode unit electrically chargeable by application of voltage thereto and an insulating unit covering the electrode unit, the electrode unit being configured to attract and separate a material to and from a surface of the insulating unit by control of a charged state of the electrode unit.

10 Claims, 11 Drawing Sheets

(51) Int. Cl.
*B29C 64/209* (2017.01)
*B29C 64/188* (2017.01)
*B29C 67/00* (2017.01)
*B22F 3/105* (2006.01)
*B29C 64/153* (2017.01)
*B29C 64/236* (2017.01)
*B29C 64/205* (2017.01)
*B29C 64/40* (2017.01)
*B33Y 10/00* (2015.01)

(52) U.S. Cl.
CPC .......... *B29C 64/188* (2017.08); *B29C 64/205* (2017.08); *B29C 64/209* (2017.08); *B29C 64/236* (2017.08); *B29C 64/307* (2017.08); *B29C 64/40* (2017.08); *B29C 67/00* (2013.01); *B33Y 10/00* (2014.12); *B22F 2003/1056* (2013.01); *B22F 2999/00* (2013.01); *Y02P 10/295* (2015.11)

(58) Field of Classification Search
CPC ..... B29C 64/153; B29C 64/205; B29C 64/40; B33Y 30/00; B33Y 10/00; B22F 2003/1056; B22F 2999/00; B22F 3/1055; Y02P 10/295
See application file for complete search history.

(56) References Cited

U.S. PATENT DOCUMENTS

| | | | |
|---|---|---|---|
| 5,718,279 A * | 2/1998 | Satoh | B29C 33/3807 164/456 |
| 6,376,148 B1 * | 4/2002 | Liu | B22F 3/008 430/124.4 |
| 2012/0018920 A1 | 1/2012 | Ogiso et al. | |
| 2012/0231175 A1 * | 9/2012 | Tan | G03G 15/224 427/469 |
| 2015/0314578 A1 * | 11/2015 | Taniuchi | B32B 37/0046 156/240 |

FOREIGN PATENT DOCUMENTS

| | | |
|---|---|---|
| JP | 2005-186474 A | 7/2005 |
| JP | 2006-289650 A | 10/2006 |
| JP | 2012-28651 A | 2/2012 |
| JP | 2015-66714 A | 4/2015 |

* cited by examiner

MATERIAL FEEDING DEVICE, ADDITIVE MANUFACTURING APPARATUS, AND MATERIAL SUPPLYING METHOD

FIELD

Embodiments described herein relate generally to a material feeding device, an additive manufacturing apparatus, and a material feeding method.

BACKGROUND

There is known an additive manufacturing apparatus such as a three-dimensional printer which forms layers of a powdered material and solidifies the material for each of the layers using a binder (bonding agent) or laser light to manufacture a three-dimensional shape.

DETAILED DESCRIPTION

According to one embodiment, a material feeding device includes a feeding unit. The feeding unit includes an electrode unit electrically chargeable by application of voltage thereto and an insulating unit covering the electrode unit, the electrode unit being configured to attract and separate a material to and from a surface of the insulating unit by control of a charged state of the electrode unit.

Hereinbelow, a first embodiment will be described with reference to FIGS. 1 to 5. Note that, in the present specification, a vertically upper direction is referred to as an upper direction, and a vertically lower direction is referred to as a lower direction. A plurality of expressions may be used for an element according to an embodiment and description for the element. The use of another expression that is not described for the element and the description is not precluded. Further, for an element and description without a plurality of expressions, the use of another expression is not precluded.

Figure 1:
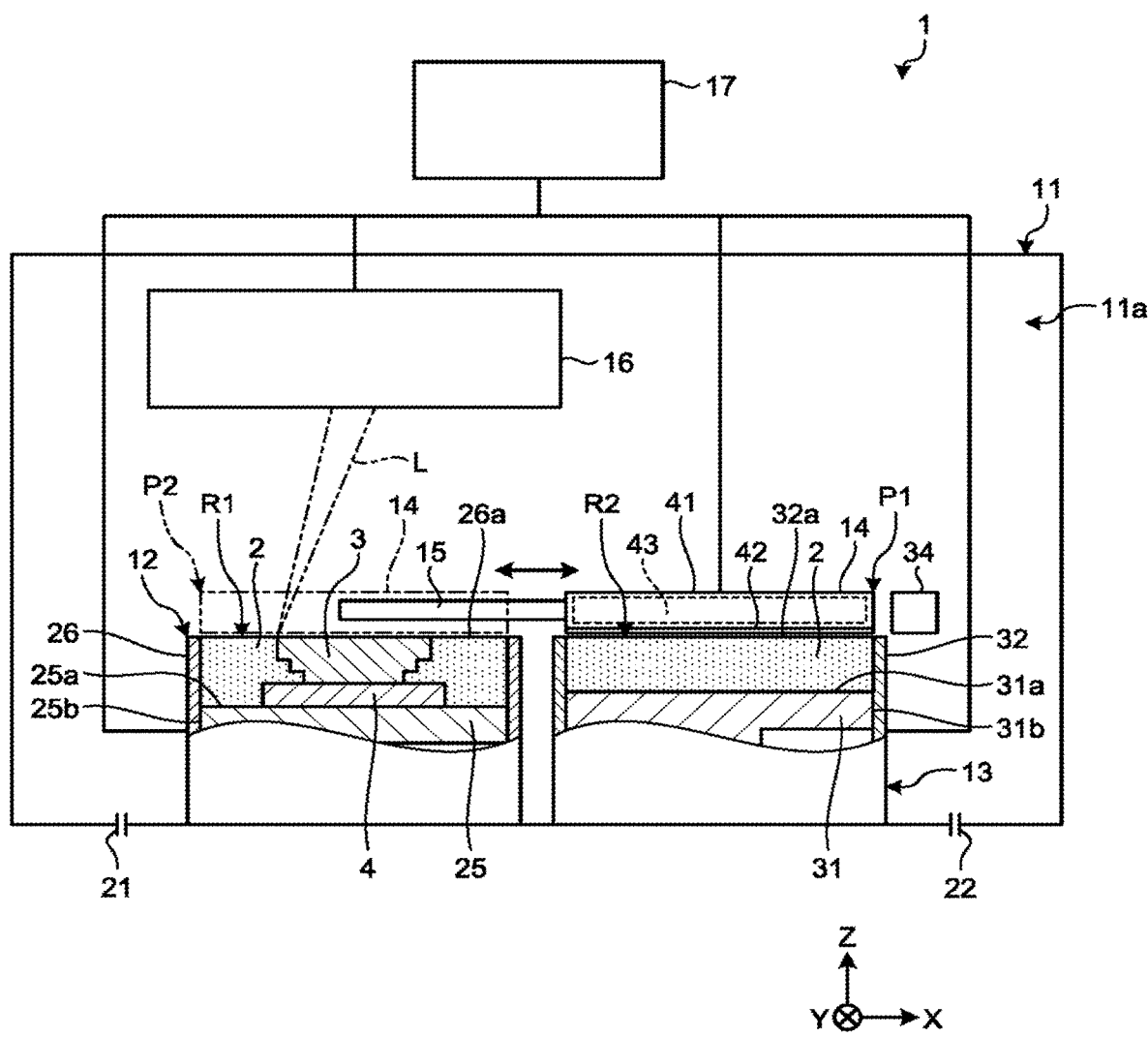
FIG. 1 is a diagram schematically illustrating a three-dimensional printer according to a first embodiment.

FIG. 1 is a diagram schematically illustrating a three-dimensional printer 1. The three-dimensional printer 1 is an example of an additive manufacturing apparatus. The additive manufacturing apparatus is not limited to a three-dimensional printer, and may be another apparatus. The three-dimensional printer 1 repeatedly performs formation of a layer of a powdered material 2 and solidification of the layer of the material 2 to manufacture a manufactured object 3 having a three-dimensional shape on, for example, a manufacturing substrate 4. FIG. 1 illustrates the manufactured object 3 in the middle of formation.

In the present embodiment, the material 2 is, for example, a powdered metal material having a median particle diameter of approximately 40 μm. Note that the material 2 is not limited thereto, and may be, for example, ceramic or a synthetic resin. The manufactured object 3 and the manufacturing substrate 4 are made of, but not limited to, the same material as the powdered material 2.

As illustrated in FIG. 1, the three-dimensional printer 1 includes a processing tank 11, a manufacturing tank 12, a material tank 13, a material feeding device 14, a moving device 15, an optical device 16, and a control unit 17. The processing tank 11 may also be called, for example, a housing. The manufacturing tank 12 may also be called, for example, a base, a stage, a manufacturing region, or a feeding region. The material tank 13 (housing unit) is an example of a housing unit and may also be called, for example, a storage unit or a feeding unit. The material feeding device 14 (feeding unit) is an example of a feeding unit and may also be called, for example, a holding unit, a dropping unit, an application unit, or a spreading unit. The moving device 15 is an example of a moving unit and may also be called, for example, a conveyance unit. The optical device 16 (manufacturing unit) is an example of a manufacturing unit and may also be called, for example, a formation unit, a solidification unit, or a bonding unit.

In the present specification, an X axis, a Y axis, and a Z axis are defined as illustrated in the drawings. The X axis, the Y axis, and the Z axis are perpendicular to each other. In the present specification, an X-axis direction corresponds to a width direction of the material feeding device 14, a Y-axis direction corresponds to a depth (length) direction of the material feeding device 14, and a Z-axis direction corresponds to a height direction of the material feeding device 14.

The processing tank 11 is formed in, for example, a sealable box shape. The processing tank 11 includes a processing chamber 11a. The processing chamber 11a houses the manufacturing tank 12, the material tank 13, the material feeding device 14, the moving device 15, and the optical device 16. Note that the manufacturing tank 12, the material tank 13, the material feeding device 14, the moving device 15, and the optical device 16 may be present outside the processing chamber 11a.

The processing chamber 11a of the processing tank 11 is provided with a feed port 21 and a discharge port 22. For example, a feeding device which is disposed outside the processing tank 11 feeds an inert gas such as nitrogen or argon into the processing chamber 11a through the feed port 21. For example, a discharging device which is disposed outside the processing tank 11 discharges the inert gas in the processing chamber 11a through the discharge port 22.

In the manufacturing tank 12, formation of a layer of the material 2 and solidification of the layer of the material 2 are repeatedly performed. Accordingly, the manufactured object 3 having a three-dimensional shape is manufactured inside the manufacturing tank 12. The manufacturing tank 12 includes a mounting base 25 and a peripheral wall 26.

The mounting base 25 is, for example, a square plate. Note that the shape of the mounting base 25 is not limited thereto, and the mounting base 25 may be a member having another shape such as another quadrangle (quadrilateral) such as a rectangle, a polygon, a circle, or a geometric shape. The mounting base 25 is made of, for example, a conductor such as metal. The mounting base 25 is grounded, but not limited thereto.

The mounting base 25 includes an upper face 25a and an end face 25b. The upper face 25a is, for example, a quadrangular flat face which faces upward and has a size of 2.50 mm×250 mm. Note that the size and the shape of the upper face 25a are not limited thereto. The end face 25b is perpendicular to the upper face 25a.

The peripheral wall 26 is formed in, for example, a quadrangular tubular shape which extends in a direction along the Z axis and surrounds the mounting base 25. The end face 25b of the mounting base 25 is in contact with an inner face of the peripheral wall 26. The peripheral wall 26 is formed in a quadrangular frame shape and includes an open upper end 26a.

The manufacturing substrate 4 is mounted and fixed onto the upper face 25a of the mounting base 25, and the material 2 is accumulated thereon. Further, the manufactured object 3 is manufactured on the manufacturing substrate 4. Note that the manufactured object 3 may be directly manufactured on the upper face 25a of the mounting base 25 without disposing the manufacturing substrate 4 on the upper face 25a of the mounting base 25. In the manufacturing tank 12, the material 2, the manufactured object 3, and the manufacturing substrate 4 are surrounded by the peripheral wall 26.

At least one of the material 2, the manufactured object 3, and the manufacturing substrate 4 on the mounting base 25 forms a feeding region R1 which is exposed from the upper end 26a of the peripheral wall 26. The feeding region R1 is an example of a region to which the material is fed. The feeding region R1 is a planar part facing upward. The size and the shape of the feeding region R1 are substantially the same as the size and the shape of the upper face 25a of the mounting base 25.

The mounting base 25 is movable in the direction along the Z axis inside the peripheral wall 26 by various devices such as a hydraulic elevator. The feeding region R1 which is formed of at least one of the material 2, the manufactured object 3, and the manufacturing substrate 4 on the mounting base 25 moves up and down by the movement of the mounting base 25.

The material tank 13 stores the material 2 for forming a layer in the manufacturing tank 12. The material tank 13 is adjacent to the manufacturing tank 12, but may be disposed away from the manufacturing tank 12. The material tank 13 includes a support base 31, a peripheral wall 32, a charging unit 33 of FIG. 2, and a squeezing unit 34.

The support base 31 is, for example, a square plate similarly to the mounting base 25 of the manufacturing tank 12. Note that the shape of the support base 31 is not limited thereto. The support base 31 is made of, for example, a conductor such as metal.

The support base 31 includes an upper face 31a and an end face 31b. The upper face 31a is, for example, a flat face which has the same size and shape as the upper face 25a of the mounting base 25 and faces upward. Note that the size and the shape of the upper face 31a are not limited thereto. The end face 31b is perpendicular to the upper face 31a.

The peripheral wall 32 is formed in, for example, a quadrangular tubular shape which extends in the direction along the Z axis and surrounds the support base 31. The end face 31b of the support base 31 is in contact with an inner face of the peripheral wall 32. The peripheral wall 32 is formed in a quadrangular frame shape and includes an open upper end 32a.

The material 2 is accumulated on the upper face 31a of the support base 31 and surrounded by the peripheral wall 32. The material 2 stored in the material tank 13 forms an attracting region R2 which is exposed from the upper end 32a of the peripheral wall 32. The attracting region R2 is a planar part facing upward. The size and the shape of the attracting region R2 are substantially the same as the size and the shape of the upper face 31a of the support base 31.

The support base 31 is movable in the direction along the Z axis inside the peripheral wall 32 by various devices such as a hydraulic elevator. The attracting region R2 which is formed of the material 2 moves up and down by the movement of the support base 31.

Figure 2:
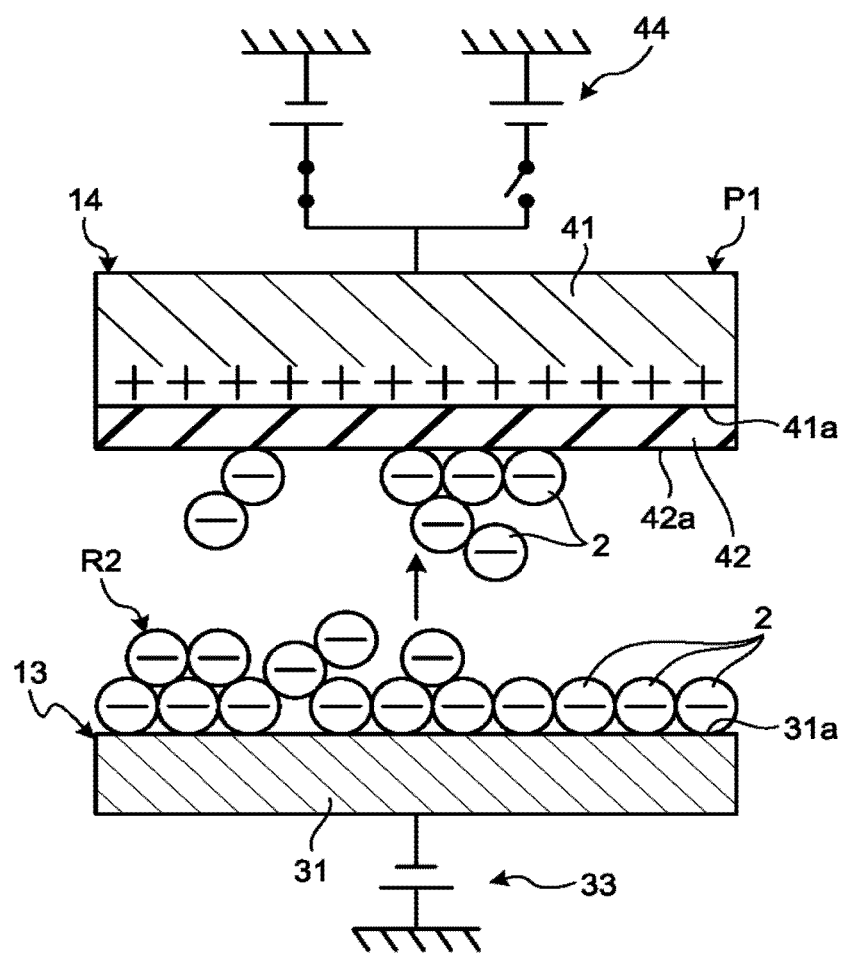
FIG. 2 is a sectional view schematically illustrating a part of a material tank and a part of a material feeding device according to the first embodiment.

FIG. 2 is a sectional view schematically illustrating a part of the material tank 13 and a part of the material feeding device 14. The charging unit 33 is connected to the support base 31. The charging unit 33, for example, applies current (applies voltage) to the support base 31 to electrically charge the support base 31 and the material 2 supported on the support base 31. In other words, the charging unit 33 applies a charge to the material 2. Not that the charging unit 33 is not limited thereto, and may charge the support base 31 and the material 2 by, for example, corona discharge. The charging unit 33, for example, negatively (minus) charges the material 2 as illustrated in FIG. 2, but may positively (plus) charge the material 2. The material 2 in the material tank 13 may be uncharged and has zero charge.

The squeezing unit 34 illustrated in FIG. 1 includes, for example, a roller or a flexible blade. The squeezing unit 34 extends a direction along the X axis or the Y axis, and is movable in a direction intersecting the extending direction. The squeezing unit 34 moves to smooth the attracting region R2 formed of the material 2. Accordingly, the squeezing unit 34, for example, makes the attracting region R2 of the material 2 substantially flush with the upper end 32a of the peripheral wall 32.

For example, a sufficient amount of the material 2 is previously stored in the material tank 13. When the material 2 in the material tank 13 is reduced and the attracting region R2 is lowered below the upper end 32a of the peripheral wall 32, the support base 31 moves up. Accordingly, the support base 31 keeps the attracting region R2 substantially flush with the upper end 32a of the peripheral wall 32. The material 2 in the material tank 13 is not limited thereto, and may, for example, be refilled from another device to the material tank 13 as the material 2 is reduced.

The material feeding device 14 feeds the material 2 stored in the material tank 13 to the manufacturing tank 12 to form a layer of the material 2. The material feeding device 14 includes an attracting substrate 41 (electrode unit) and an insulating layer 42 (insulating unit), a temperature raising device 43, and a charging unit 44 of FIG. 2. The attracting substrate 41 is an example of an electrode unit and may also be called, for example, a suction unit, an attracting unit, or a holding unit. The insulating layer 42 is an example of an insulating unit and may also be called, for example, a partition wall, a wall, or a film. The temperature raising device 43 is an example of a temperature raising unit and may also be called, for example, a warning unit, a heating unit, or a heater.

The attracting substrate 41 is, for example, a square plate similarly to the mounting base 25. Note that the shape of the attracting substrate 41 is not limited thereto. The attracting substrate 41 is made of, for example, a conductor such as metal. Thus, the attracting substrate 41 is electrically charged by current applied from the charging unit 44. Note that the attracting substrate 41 is not limited thereto, and may be made of, for example, a semiconductor.

As illustrated in FIG. 2, the attracting substrate 41 includes a lower face 41a. The lower face 41a is, for example, a flat face which has the same size and shape as the upper face 25a of the mounting base 25 and faces downward. Note that the size and the shape of the lower face 41a are not limited thereto.

The charging unit 44 is controlled by the control unit 17 and capable of applying current (applying voltage) to the attracting substrate 41. The charging unit 41 selectively applies a positive current or a negative current to the attracting substrate 41. Note that the charging unit 44 is not limited thereto, and may apply only either a positive current or a negative current to the attracting substrate 41.

The insulating layer 42 is made of, for example, an insulator such as a synthetic resin or ceramic. The insulating layer 42 is formed on the lower face 41a of the attracting substrate 41 and covers the lower face 41a. Note that the insulating layer 42 may partially expose the lower face 41a of the attracting substrate 41.

The insulating layer 42 includes a surface 42a which faces downward. The surface 42a is a flat face which has the same size and shape as the upper face 25a of the mounting base 25 and faces downward. Note that the size and the shape of the surface 42a are not limited thereto.

As illustrated in FIG. 1, the temperature raising device 43 is disposed, for example, inside the attracting substrate 41. The temperature raising device 43 is capable of raising the temperature of the attracting substrate 41 and the insulating layer 42 so as to be maintained a predetermined temperature. That is, the temperature raising device 43 is capable of raising the temperature of the surface 42a of the insulating layer 42. The surface 42a of the insulating layer 42 becomes likely to be dried by the rise in temperature by the temperature raising device 43.

The moving device 15 includes a rail which is coupled to the material feeding device 14, a conveyance arm, or various other devices. The moving device 15 is, for example, capable of parallelly moving the material feeding device 14 in directions along the X axis, the Y axis, and the Z axis.

The moving device 15, for example, moves the material feeding device 14 between an attracting position P1 and a feeding position P2. In FIG. 1, the material feeding device 14 located at the attracting position P1 is indicated by a solid line, and the material feeding device 14 located at the feeding position P2 is indicated by a two-dot chain line.

The material feeding device 14 present at the attracting position P1 is located above the material tank 13. As illustrated in FIG. 2, the surface 42a of the insulating layer 42 of the material feeding device 14 faces the attracting region R2 which is formed of the material 2 stored in the material tank 13 at the attracting position P1. Thus, the lower face 41a of the attracting substrate 41 faces the material 2 in the material tank 13 through the insulating layer 42.

As illustrated in FIG. 1, the material feeding device 14 present at the feeding position P2 is located above the manufacturing tank 12. The surface 42a of the insulating layer 42 of the material feeding device 14 faces the feeding region R1 which is formed of at least one of the material 2, the manufactured object 3, and the manufacturing substrate 4 in the manufacturing tank 12 at the feeding position P2. Thus, the lower face 41a of the attracting substrate 41 faces the feeding region R1 through the insulating layer 42.

The attracting position P1 and the feeding position P2 are located at places that are off each other. In this manner, the moving device 15 changes the relative position of the material feeding device 14 with respect to the feeding region R1 and the attracting region R2. In other words, the material feeding device 14 can be disposed at both the attracting position P1 and the feeding position P2. Note that the moving device 15 may, for example, move the manufacturing tank 12 and the material tank 13 with respect to the material feeding device 14.

The optical device 16 includes various components such as a light source which includes an oscillation element and emits laser light L, a conversion lens which converts the laser light L into parallel light, a convergent lens which converges the laser light L, and a galvanometer mirror which moves an application position of the laser light L. The optical device 16 is capable of changing the power density of the laser light L.

The optical device 16 is located above the manufacturing tank 12. Note that the optical device 16 may be disposed in another place. The optical device 16 converts the laser light L emitted from the light source into parallel light using the conversion lens. The optical device 16 reflects the laser light L using the galvanometer mirror whose tilt angle is changeable and converges the laser light L using the convergent lens to apply the laser light L to a desired position.

The control unit 17 is electrically connected to the manufacturing tank 12, the material tank 13, the material feeding device 14, the moving device 15, and the optical device 16. The control unit 17 includes various electronic components such as a CPU, a ROM, and a RAM. The control unit 17 reads and executes a program which is stored in the ROM or another storage device to control the manufacturing tank 12, the material tank 13, the material feeding device 14, the moving device 15, and the optical device 16. The three-dimensional printer 1 manufactures the manufactured object 3 on the basis of the control (program) of the control unit 17.

Hereinbelow, an example of a procedure of manufacturing the manufactured object 3 from the powdered material 2 by the three-dimensional printer 1 will be described. Note that a method for manufacturing the manufactured object 3 by the three-dimensional printer 1 is not limited to the method described below.

First, three-dimensional shape data of the manufactured object 3 is input to the control unit 17 of the three-dimensional printer 1 from, for example, an external personal computer. The three-dimensional shape data is, for example, CAD data, but not limited thereto.

The control unit 17 generates data of a plurality of cross-sectional shapes from the three-dimensional shape data of the manufactured object 3. For example, the control unit 17 divides the three-dimensional shape of the manufactured object 3 into plurality of layers of a predetermined thickness and generates cross-sectional shape data of each of the layers. In the present embodiment, the control unit 17 generates, for example, data of a plurality of cross-sectional shapes each having a thickness of 50 μm from the three-dimensional shape data of the manufactured object 3. Note that the thickness of each cross-sectional shape is not limited thereto.

Then, the moving device 15 disposes the material feeding device 14 at the attracting position P1. At the attracting position P1, the surface 42a of the insulating layer 42 of the material feeding device 14 faces the attracting region R2 which is formed of the material 2 in the material tank 13. A gap is formed between the surface 42a of the insulating layer 42 and the attracting region R2. Note that the surface 42a of the insulating layer 42 may be in contact with the material 2 of the attracting region R2.

As illustrated in FIG. 2, the charging unit 33 of the material tank 13 negatively charges the material 2. On the other hand, the charging unit 44 of the material feeding device 14 applies a positive current to the attracting substrate 41 at the attracting position P1. That is, the material feeding device 14 applies a current having a polarity opposite to the polarity of the charged material 2 to the attracting substrate 41. Accordingly, the material 2 stored in the material tank 13 is attracted toward the attracting substrate 41 by the Coulomb force (an attracting force). In other words, the material 2 moves toward the attracting substrate 41.

The material 2 attracted to the attracting substrate 41 is adhered to the surface 42a of the insulating layer 42 which is interposed between the attracting substrate 41 and the attracting region R2. That is, the material feeding device 14 attracts the material 2 in the material tank 13 to the surface 42a of the insulating layer 42.

The material 2 which is negatively charged and the attracting substrate 41 through which a positive current flows are insulated from each other by the insulating layer 42. Thus, the material 2 is held by the surface 42a of the insulating layer 42 with being negatively charged. In this manner, the attracting substrate 41 attracts the material 2 to the surface 42a of the insulating layer 42 by control of a charged state thereof.

Figure 3:
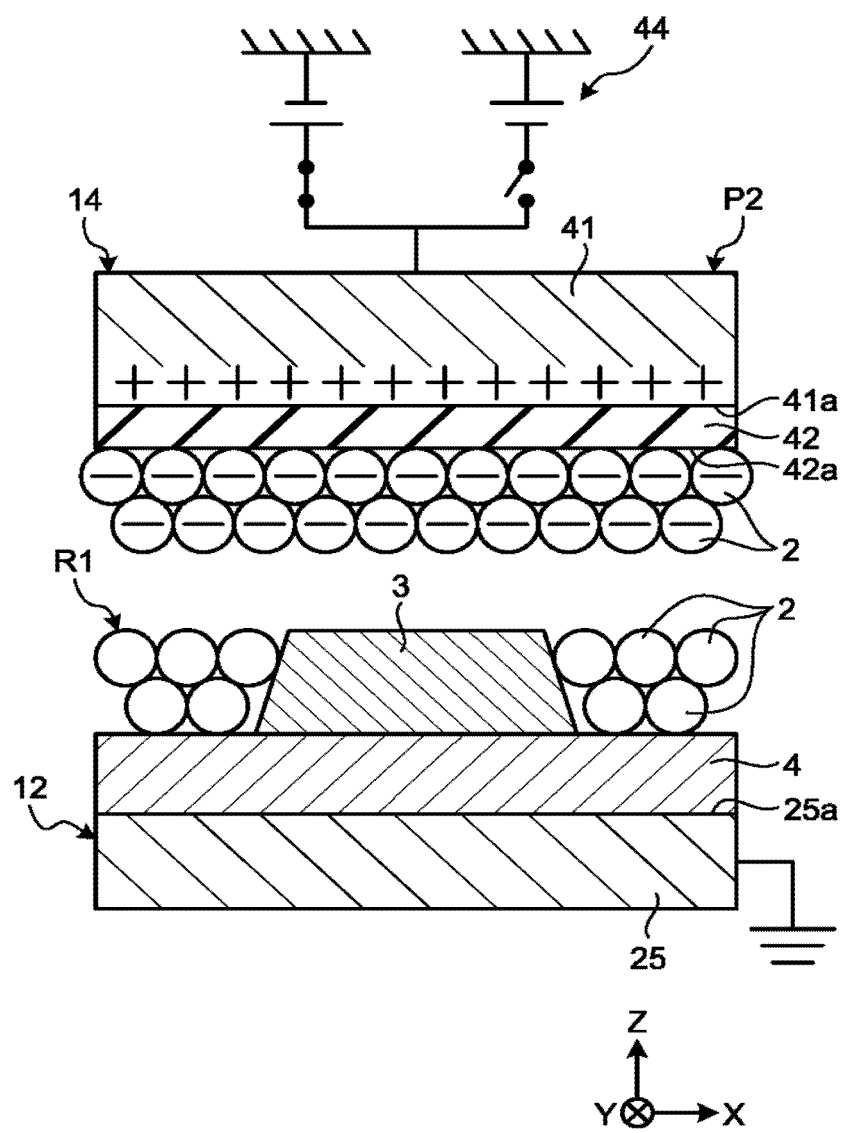
FIG. 3 is a sectional view schematically illustrating a part of a manufacturing tank and a part of the material feeding device according to the first embodiment.

FIG. 3 is a sectional view schematically illustrating a part of the manufacturing tank 12 and a part of the material feeding device 14. As illustrated in FIG. 3, the material 2 in the material tank 13 is attracted to the surface 42a of the insulating layer 42, so that a layer of the material 2 is formed on the surface 42a of the insulating layer 42. In the layer of the material 2, a plurality of negatively charged particles of the material 2 are adjacent to each other. Thus, electrostatic repulsion occurs between e particle of the material 2 and another particle of the material 2. Thus, the layer of the material 2 on the surface 42a of the insulating layer 42 has a substantially uniform thickness.

Further, the thickness of the layer of the material 2 on the surface 42a of the insulating layer 42 is determined by the current applied to the attracting substrate 41 by the charging unit 44. In the present embodiment, the material feeding device 14 forms, for example, a layer of the material 2 having a thickness of 50 μm which is equal to the thickness of the above cross-sectional shape data on the surface 42a of the insulating layer 42. Note that the thickness of the layer the material 2 is not limited thereto.

Then, the moving device 15 moves the material feeding device 14 with the material 2 attracted from the attracting position P1 to the feeding position P2. In FIG. 3, the surface 42a of the insulating layer 42 of the material feeding device 14 which has reached the feeding position P2 faces the feeding region R1 which is formed of the material 2 and the manufactured object 3. That is, the layer of the material 2 formed on the surface 42a of the insulating layer 42 faces the feeding region R1.

The manufacturing tank 12 previously lowers the feeding region R1 below the upper end 26a of the peripheral wall 26 by moving the mounting base 25 downward. The distance (difference in height) between the feeding region R1 and the upper end 26a of the peripheral wall 26 in the direction along the Z axis is, for example, 50 μm which is equal to the thickness of the above cross-sectional shape data.

Figure 4:
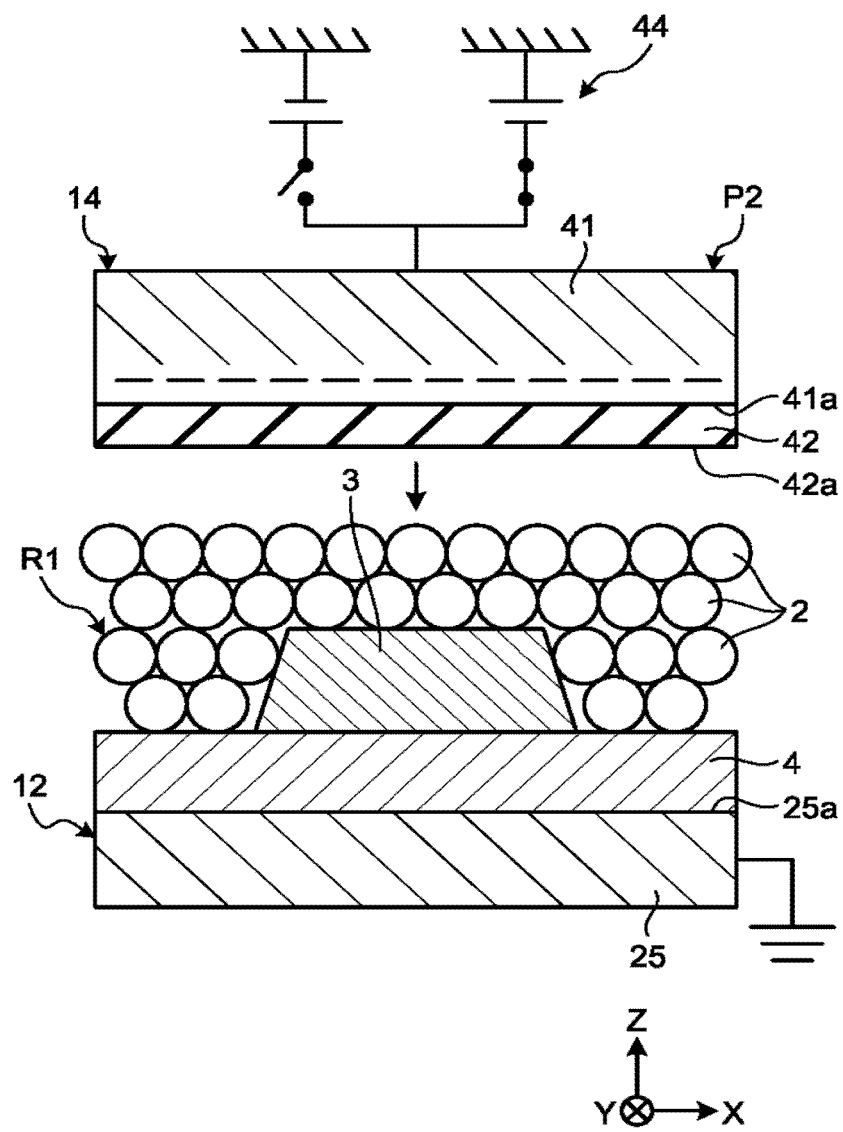
FIG. 4 is a sectional view schematically illustrating the material feeding device which feeds a material to a feeding region according to the first embodiment.

FIG. 4 is a sectional view schematically illustrating the material feeding device 14 which feeds the material 2 to the feeding region R1. As illustrated in FIG. 4, the charging unit 44 applies a negative current to the attracting substrate 41 at the feeding position P2. That is, the charging unit 44 applies a current having the same polarity as the charged material 2 to the attracting substrate 41. Accordingly, the material 2 attracted to the surface 42a of the insulating layer 42 moves toward the feeding region R1 by the Coulomb force (a repulsive force). In other words, the material 2 is separated from the surface 42a of the insulating layer 42 and fed to the feeding region R1. In this manner, the attracting substrate 41 separates the material 2 from the surface 42a of the insulating layer 42 by control of a charged state thereof.

The mounting base 25 in the manufacturing tank 12 is grounded. The material 2, the manufactured object 3, and the manufacturing substrate 4 which are mounted on the mounting base 25 are grounded through the mounting base 25 and have zero charge. This reduces the generation of the Coulomb force between the material 2 on the surface 42a of the insulating layer 42, and the material 2, the manufactured object 3 and the manufacturing substrate 4 in the manufacturing tank 12, and the material 2 moves substantially straight from the surface 42a of the insulating layer 42 to the feeding region R1.

Note that the material feeding device 14 may make the current applied to the attracting substrate 41 zero. In this case, the Coulomb force (attracting force) between the material 2 attracted to the surface 42a of the insulating layer 42 and the attracting substrate 41 disappears. Accordingly, the material 2 attracted to the surface 42a of the insulating layer 42 falls due to the gravity and is fed to the feeding region R1.

The material 2 which forms the layer on the surface 42a of the insulating layer 42 is fed to the feeding region R1 to form a layer of the material 2 on the feeding region R1. The thickness of the layer of the material 2 formed on the feeding region R1 is substantially equal to the thickness of the layer of the material 2 formed on the surface 42a of the insulating layer 42. Thus, the upper face of the layer of the material 2 formed on the feeding region R1 is substantially flush with the upper end 26a of the peripheral wall 26.

The material 2 fed to the feeding region R1 is electrically connected to the grounded mounting base 25 through the material 2 in the manufacturing tank 12, the manufactured object 3, and the manufacturing substrate 4. Accordingly, the charge of the material 2 fed to the feeding region R1 becomes zero.

While the material feeding device 14 feeds the material 2 to the feeding region R1 of the manufacturing tank 12, the support base 31 of the material tank 13 moves upward. Accordingly, the height of the attracting region R2 which is formed of the material 2 becomes substantially equal to the height of the upper end 32a of the peripheral wall 32 of the material tank 13. The squeezing unit 34 smooths the attracting region R2, so that the attracting region R2 becomes flatter.

Then, the moving device 15 moves the material feeding device 14 to the attracting position P1. In other words, the moving device 15 withdraws the material feeding device 14 located between the manufacturing tank 12 and the optical device 16 from the position above the manufacturing tank 12.

The moving device 15 may move the material feeding device 14 downward before the withdrawal of the material feeding device 14. Accordingly, the surface 42a of the insulating layer 42 of the material feeding device 14 presses the material 2 fed to the feeding region R1 to thicken the material 2.

Figure 5:
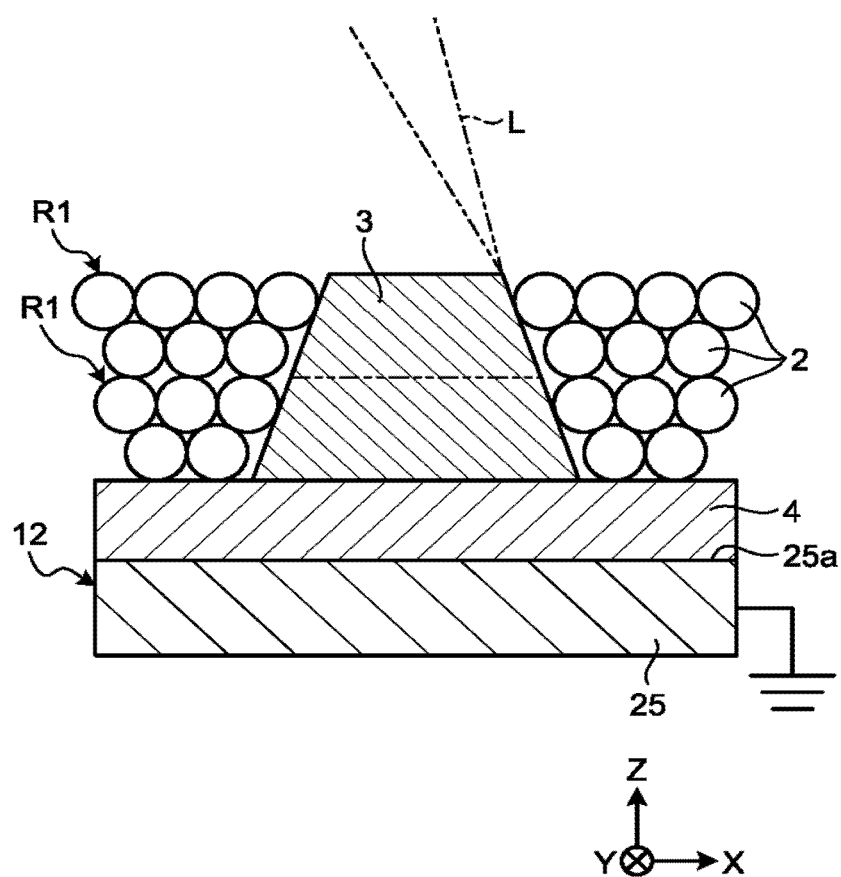
FIG. 5 is a sectional view schematically illustrating the manufacturing tank in which laser light is applied to the material according to the first embodiment.

FIG. 5 is a sectional view schematically illustrating the manufacturing tank 12 in which the laser light L is applied to the material 2. As illustrated in FIG. 5, the control unit 17 controls the optical device 16 to apply the laser light L of the optical device 16 to the material 2 which forms the layer. The control unit 17 determines the application position of the laser light L on the basis of the generated cross-sectional shape data.

A part of the layer of the material 2 to which the laser light L has been applied is molten. The optical device 16 partially melts and then solidifies the material 2 by applying the laser light L. Accordingly, a part (one layer) of the manufactured object 3 is formed in the layer of the material 2. In FIG. 5, the part of the manufactured object 3 formed by the laser light L is divided by a two-dot chain line. The material 2 may be sintered.

After the application of the laser light L to the material 2 by the optical device 16, the mounting base 25, for example, moves downward by 50 μm which is equal to the thickness of the above cross-sectional shape data. Accordingly, the distance (difference in height) between the upper face of the material 2 which forms the layer and the upper end 26a of the peripheral wall 26 in the direction along the Z axis becomes 50 μm.

The upper face of the material 2 which forms the layer and the upper face of the part of the manufactured object 3 formed in the layer form the next feeding region R1. The material feeding device 14 again feeds the material 2 to the feeding region R1 following the above procedure.

The material feeding device 14 laminates the material 2 in the same manner as described above to sequentially form a plurality of layers of the material 2. Every time a layer of the material 2 is formed, the optical device 16 partially melts the material 2 which forms the layer to form a part of the manufactured object 3. The three-dimensional printer 1 repeatedly performs the formation of the layer of the material 2 by the material feeding device 14 and the melting of the material 2 by the optical device 16 to manufacture the manufactured object 3 having a three-dimensional shape.

The manufactured object 3 manufactured inside the processing tank 11 is taken out of the processing chamber 11a by, for example, opening a cover attached to the processing tank 11. Note that the manufactured object is not limited thereto, and the manufactured object 3 may be conveyed to the outside of processing chamber 11a by, for example, a conveyance device which includes a conveyance arm. The manufactured object 3 is conveyed to a chamber (sub chamber) which is isolated from the processing chamber 11a by, for example, an openable/closable door.

Particles of the material 2 to which the laser light L has not been applied remain powdered. Thus, the manufactured object 3 can be easily taken out from the material 2. The remaining powdered particles of the material 2 are collected and reused.

In the three-dimensional printer 1 according to the first embodiment, the attracting substrate 41 of the material feeding device 14 is capable of attracting the material 2 to the surface 42a of the insulating layer 42 and separating the material 2 from the surface 42a of the insulating layer 42 by the control of a charged state thereof. The material feeding device 14 forms the layer of the material 2 by feeding the material 2 to the feeding region R1 at the feeding position P2. That is, the layer of the material 2 adhered to the insulating layer 42 is directly fed to the feeding region R1. Accordingly, a feeding time of the material 2 is reduced.

Further, the attracting substrate 41 of the material feeding device 14 attracts the material 2 to the surface 42a of the insulating layer 42 by the control of a charged state thereof. Thus, the thickness of the layer of the material 2 adhered to the surface 42a of the insulating layer 42 becomes substantially uniform by electrostatic repulsion. Even when the sizes of powdered particles of the material 2 are nonuniform, the thickness of the layer of the material 2 on the insulating layer 42 becomes substantially uniform. Thus, the layer of the material 2 formed on the feeding region R1 becomes substantially flat without being smoothed, which reduces the feeding time of the material 2. The orientations of the particles of the material 2 are aligned when attracted to the surface 42a of the insulating layer 42. Thus, the layer of the material 2 formed on the surface 42a of the insulating layer 42 becomes denser. Further, the thickness of the layer of the material 2 attracted to the insulating layer 42 is adjustable by adjusting current applied to the attracting substrate 41 by the charging unit 44.

The temperature raising device 43 is capable of raising the temperature of the surface 42a of the insulating layer 42. When the temperature of the surface 42a of the insulating layer 42 is raised, the surface 42a of the insulating layer 42 is dried. This reduces obstruction to the feeding of the material 2 caused by the material 2 adhered to the surface 42a of the insulating layer 42 due to, for example, the viscosity of moisture. Thus, the feeding time of the material 2 is reduced, and feeding failure of the material 2 is reduced. Further, since the temperature of the material 2 attracted to the insulating layer 42 is raised by the temperature raising device 43, for example, the efficiency of processing such as melting by the laser light L is improved.

The charging unit 33 applies a charge to the material 2 in the material tank 13. Accordingly, the material feeding device 14 can easily attract the material 2 to the surface 42a of the insulating layer 42 by applying a current having a polarity opposite to the polarity of the charge applied to the material 2 to the attracting substrate 41. This enables the material feeding device 14 to more quickly attract the material 2 and the feeding time of the material 2 to be reduced.

The material feeding device 14 separates the material 2 from the surface 42a of the insulating layer 42 by applying a current having the same polarity as the charge applied to the material 2 to the attracting substrate 41. Accordingly, the material feeding device 14 can easily feed the material 2 adhered to the surface 42a of the insulating layer 42 to the feeding region R1 and reduce the material 2 remaining on the surface 42a of the insulating layer 42. Thus, the feeding time of the material 2 is reduced, and the feeding failure of the material 2 is reduced.

The squeezing unit 34 smooths the material 2 in the material tank 13. Accordingly, the thickness of the layer of the material 2 adhered to the surface 42a of the insulating layer 42 is likely to become more uniform. Thus, the feeding failure of the material 2 is reduced. Further, an increase in the feeding time of the material 2 is reduced by smoothing the material 2 in the material tank 13 by the squeezing unit 34 while the material feeding device 14 feeds the material 2 to the feeding region R1.

In the first embodiment, the mounting base 25 of the manufacturing tank 12 is grounded. However, the mounting base 25 may be configured in such a manner that current can flow therethrough. The manufacturing tank 12 is capable of attracting the material 2 adhered to the surface 42a of the insulating layer 42 of the material feeding device 14 and fixing (electrostatic chuck) the material 2, the manufactured object 3, and the manufacturing substrate 4 by applying current through the mounting base 25. In this case, a layer of an insulator such as a synthetic resin or ceramic is formed on the upper face 25a of the mounting base 25.

Hereinbelow, a second embodiment will be described with reference to FIGS. 6 to 9. In the following description for a plurality of embodiments, an element having a function similar to the function of an already-described element is denoted by the same reference sign as the already-described element, and description thereof may be omitted. A plurality of elements denoted by the same reference sign may not necessarily have commonality in all functions and properties, and may have different functions and properties according to each of the embodiments.

Figure 6:
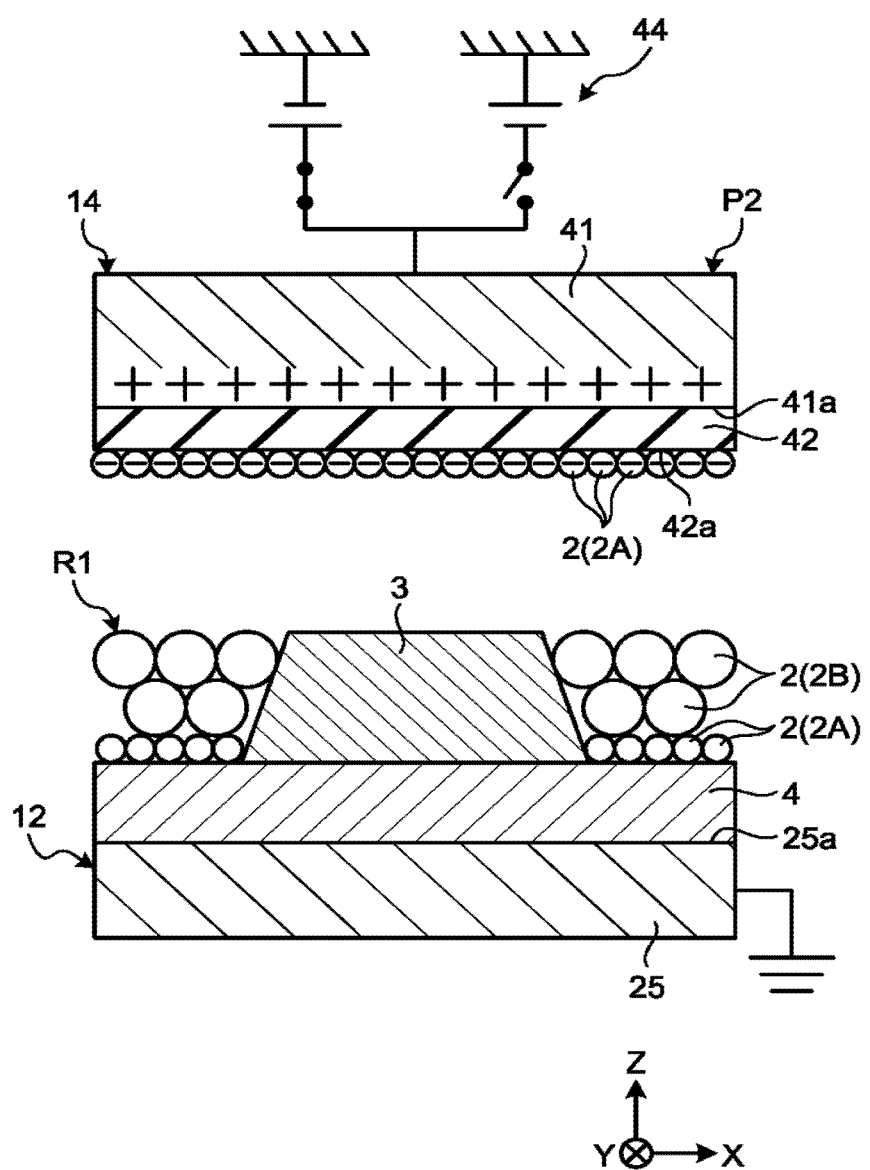
FIG. 6 is a sectional view schematically illustrating a part of a manufacturing tank and a part of a material feeding device according to a second embodiment.

FIG. 6 is a sectional view schematically illustrating a part of a manufacturing tank 12 and a part of a material feeding device 14 according to the second embodiment. In the second embodiment, a manufactured object 3 is made of two kinds of materials 2 (a first material 2A and a second material 2B). The first material 2A and the second material 2B, for example, differ from each other in kind and size.

A three-dimensional printer 1 of the second embodiment includes two material tanks 13. One of the material tanks 13 stores the first material 2A. The other material tank 13 stores the second material 2B. A moving device 15 is capable of moving the material feeding device 14 to one attracting position P1 which is located above the one material tank 13 and the other attracting position P1 which is located above the other material tank 13.

In the second embodiment, the material feeding device 14 first attracts the first material 2A to the surface 42a of insulating layer 42. Then, the material feeding device 14 feeds the first material 2A to a feeding region R1 to form a layer of the first material 2A at a feeding position P2.

Figure 7:
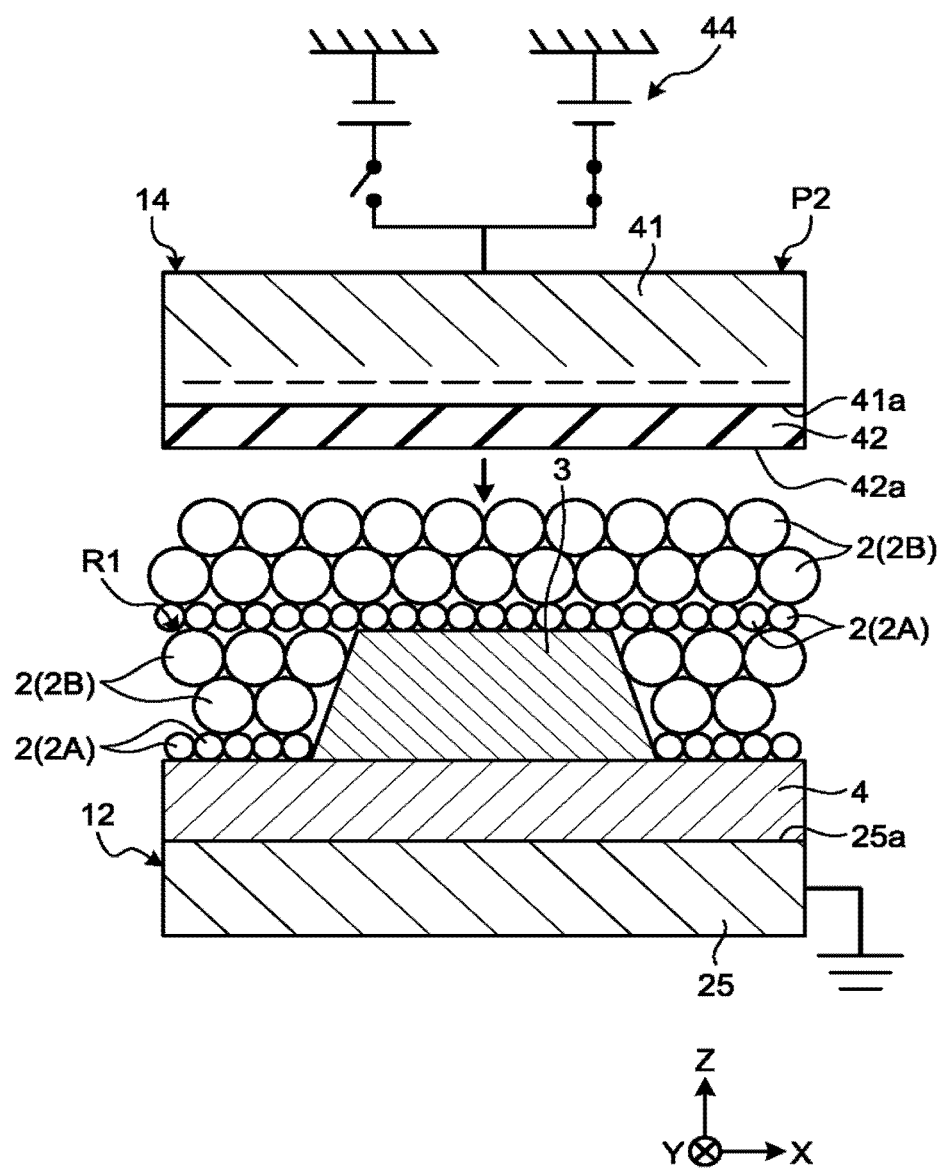
FIG. 7 is a sectional view schematically illustrating the material feeding device which feeds a second material to a feeding region according to the second embodiment.

FIG. 7 is a sectional view schematically illustrating the material feeding device 14 which feeds the second material 2B to the feeding region R1. Then, the material feeding device 14 attracts the second material 2B to the surface 42a of the insulating layer 42. Then, as illustrated in FIG. 7, the material feeding device 14 feeds the second material 2B to the upper face of the layer of the first material 2A to form a layer of the second material 2B at the feeding position P2.

The sum of the thickness of the layer of the first material 2A and the thickness of the layer of the second material 2B is 50 μm which is equal to the thickness of cross-sectional shape data generated by a control unit 17. That is, the thickness of the layer of the first material 2A formed by the material feeding device 14 and the thickness of the layer of the second material 2B formed by the material feeding device 14 are each thinner than the thickness of the cross-sectional shape data.

As illustrated in FIG. 7, the layer of the first material 2A and the layer of the second material 2B are formed on the feeding region R1. In other words, a layer of the first material 2A and the second material 2B is formed on the feeding region R1. Note that a layer formed of only the first material 2A or a layer formed of only the second material 2B may be formed on at least a part of the feeding region R1.

Figure 8:
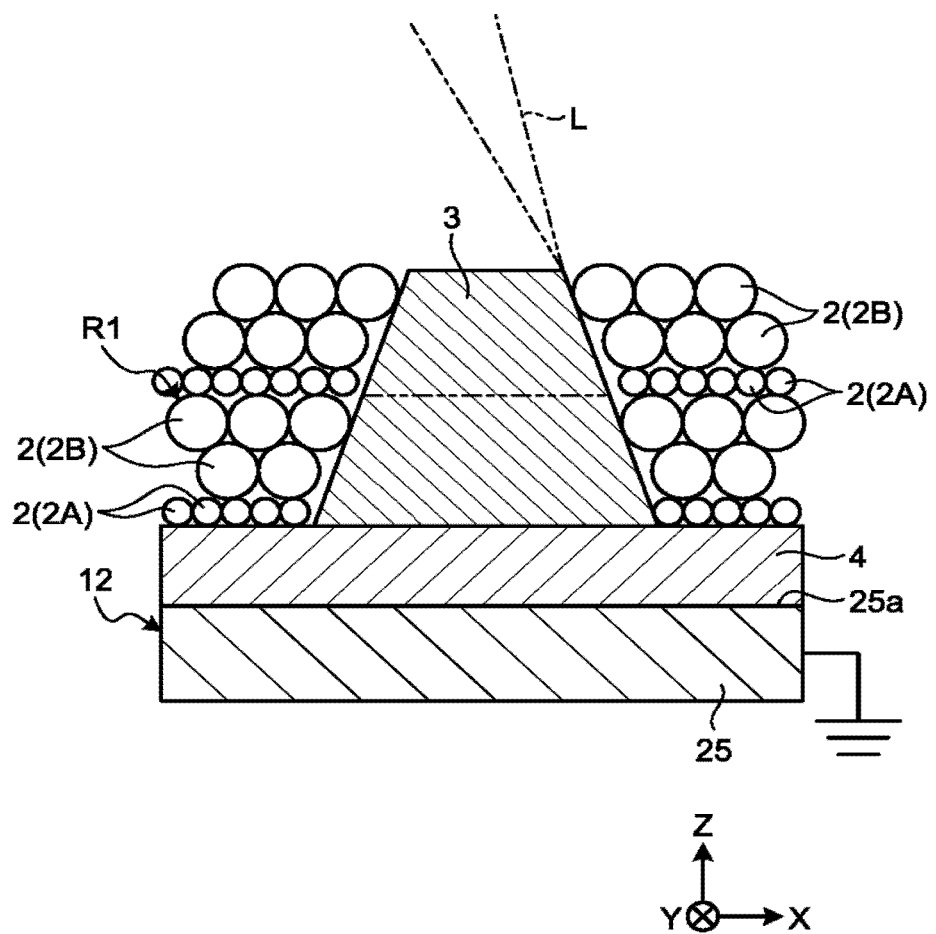
FIG. 8 is a sectional view schematically illustrating the manufacturing tank in which laser light is applied to the first and second materials according to the second embodiment.

FIG. 8 is a sectional view schematically illustrating the manufacturing tank 12 in which laser light L is applied to the first and second materials 2A, 2B. As illustrated in FIG. 8, the control unit 17 controls an optical device 16 to apply the laser light L of the optical device 16 to the first and second materials 2A, 2B which form the layer.

A part of the layer of the first and second materials 2A, 2B to which the laser light L has been applied is molten or sintered. In other words, the two kinds of materials 2 (the first material 2A and the second material 2B) are partially molten and then solidified, or sintered by the application of the laser light L. Accordingly, a part (one layer) of the manufactured object 3 which is made of the first material 2A and the second material 2B is formed.

In the three-dimensional printer 1 of the second embodiment, the material feeding device 14 forms the layer of the first material 2A and the second material 2B on the feeding region P1. This enables the three-dimensional printer 1 to easily manufacture the manufactured object 3 using a plurality of kinds of materials.

Further, the thickness of the layer of the materials 2 (the first material 2A and the second material 2B) adhered to the surface 42a of the insulating layer 42 is adjusted by adjusting current applied to the attracting substrate 41 by the charging unit 44. Thus, even when a plurality of kinds of materials 2 are used, the material feeding device 14 can easily form the layer of the materials 2 (the first material 2A and the second material 2B) having a predetermined thickness.

In the second embodiment, the first material 2A and the second material 2B differ from each other in kind and size. However, the first material 2A and the second material 2B are not limited thereto. For example, the first material 2A and the second material 2B may have substantially the same size and differ only in kind. Further, the first material 2A and the second material 2B may be the same in kind and differ in size.

Figure 9:
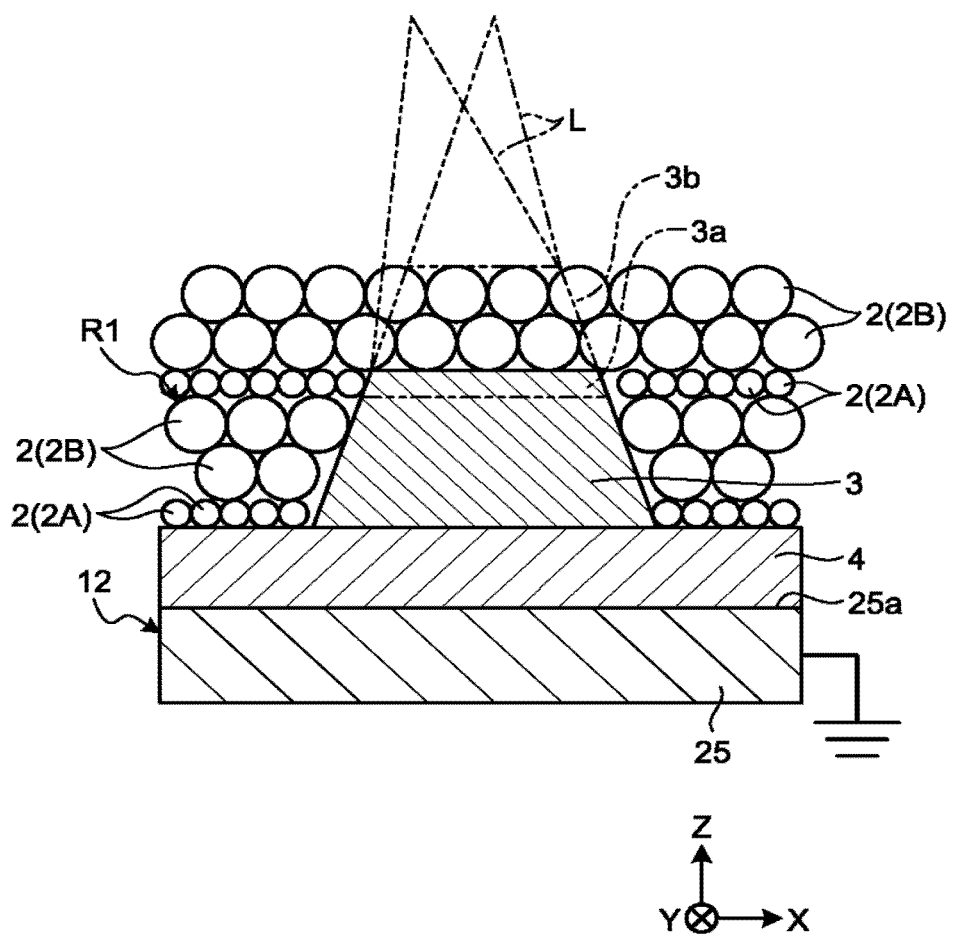
FIG. 9 is a sectional view schematically illustrating a manufacturing tank according to a modification of the second embodiment.

FIG. 9 is a sectional view schematically illustrating a manufacturing tank 12 according to a modification of the second embodiment. As illustrated in FIG. 9, the control unit 17 applies laser light L of the optical device 16 individually to the first material 2A which forms a layer and the second material 2B which forms a layer.

When the layer of the first material 2A is formed, the control unit 17 applies the laser light L of the optical device 16 to the first material 2A to partially melt the first material 2A and then solidify or sinter the first material 2A. Accordingly, a part 3a of the manufactured object 3 is formed in the layer of the first material 2A.

When the layer of the second material 2B is formed on the partially solidified layer of the first material 2A, the control unit 17 applies the laser light L of the optical device 16 to the second material 2B to partially melt the second material 2B and then solidify or sinter the second material 2B. Accordingly, a part 3b of the manufactured object 3 is formed in the layer of the second material 2B.

As described above, the control unit 17 sequentially solidifies the part of the first material 2A and the part of the second material 2B by the laser light L of the optical device 16. Accordingly, the part of the manufactured object 3 made of the first material 2A and the part of the manufactured object 3 made of the second material 2B are laminated to form the manufactured object 3.

Figure 10:
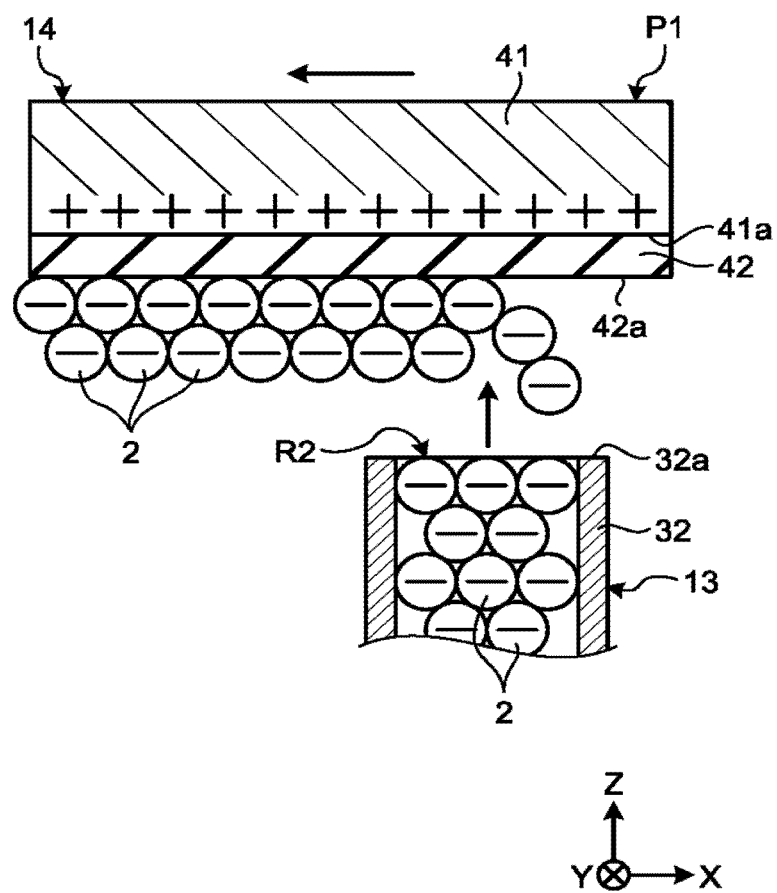
FIG. 10 is a sectional view schematically illustrating a part of a material tank and a part of a material feeding device according to a third embodiment.

Hereinbelow, a third embodiment will be described with reference to FIG. 10. FIG. 10 is a sectional view schematically illustrating a part of a material tank 13 and a part of a material feeding device 14 according to the third embodiment. As illustrated in FIG. 10, in the third embodiment, an attracting region R2 which is formed of a material 2 in the material tank 13 is narrower than surface 42a of an insulating layer 42 of the material feeding device 14. Further, the attracting region R2 is narrower than a feeding region R1.

The depth (the dimension in the Y-axis direction) of the attracting region R2 is substantially equal to the depth of the surface 42a of the insulating layer 42. On the other hand, the width (the dimension in the X-axis direction) of the attracting region R2 is narrower than the width of the surface 42a of the insulating layer 42.

A moving device 15 moves the material feeding device 14 which includes an attracting substrate 41 which is positively charged in the direction along the X axis. The surface 42a of the insulating layer 42 of the moving material feeding device 14 passes through a position that faces the material 2 which forms the attracting region R2.

A charging unit 33 of the material tank 13 negatively charges the material 2. Thus, the material 2 which forms the attracting region R2 is attracted to the surface 42a of the insulating layer 42 passing through the position facing the attracting region R2 by the Coulomb force (an attracting force). When the entire area of the surface 42a of the insulating layer 42 passes through the position facing the attracting region R2, the material 2 is adhered to the entire area of the surface 42a of the insulating layer 42.

In a three-dimensional printer 1 of the third embodiment, the material feeding device 14 moves in such a manner that the surface 42a of the insulating layer 42 passes through the position facing the material 2 to thereby attract the material 2 of the attracting region R2 to the surface 42a of the insulating layer 42. This reduces the size of the material tank 13, and the three-dimensional printer 1 can be downsized.

Note that the depth of the attracting region R2 may be smaller than the depth of the surface 42a of the insulating layer 42. In this case, the moving device 15 moves the material feeding device 14 in the X-axis direction and the Y-axis direction, so that the entire area of the surface 42a of the insulating layer 42 passes through the position facing the attracting region R2. When the entire area of the surface 42a of the insulating layer 42 passes through the position facing the attracting region R2, the material 2 is adhered to the entire area of the surface 42a of the insulating layer 42.

Figure 11:
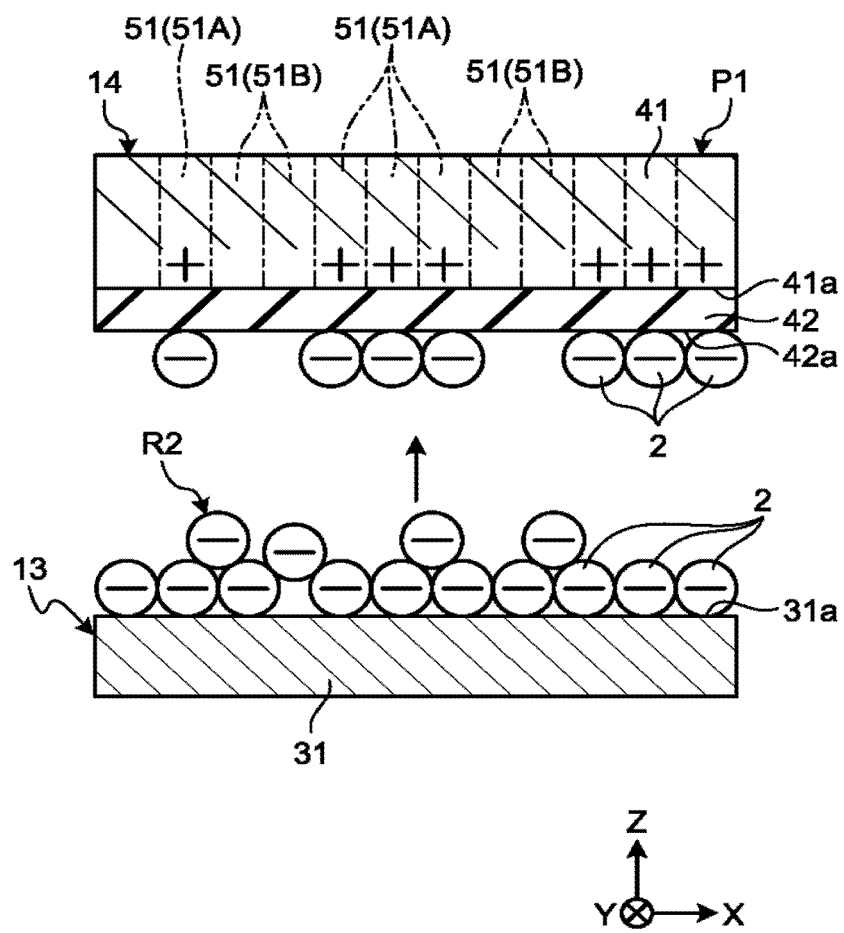
FIG. 11 is a sectional view schematically illustrating a part of a material tank and a part of a material feeding device according to a fourth embodiment.

Hereinbelow, a fourth embodiment will be described with reference to FIG. 11. FIG. 11 is a sectional view schematically illustrating a part of material tank 13 and a part of a material feeding device 14 according to the fourth embodiment. As illustrated in FIG. 11, an attracting substrate 41 of the fourth embodiment includes a plurality of electrode regions 51. FIG. 11 illustrates the electrode regions 51 partitioned by two-dot chain lines.

The electrode regions 51 are quadrangular regions provided at a pitch of several tens μm. The attracting substrate 41 of the fourth embodiment is made of, for example, a semiconductor and capable of individually applying current to the electrode regions 51. That is, the electrode regions 51 can be electrically charged by application of a positive or negative current thereto or can be zero-charged.

The material feeding device 14 applies a positive current to some of the electrode regions 51 (51A) at an attracting position P1. Accordingly, a material 2 stored in the material tank 13 is attracted to a surface 42a of an insulating layer 42 by the Coulomb force (an attracting force) at positions corresponding to the electrode regions 51A to which the positive current has been applied. On the other hand, the material 2 is not attracted to the surface 42a of the insulating layer 42 at positions corresponding to the electrode regions 51 (51B) to which no current has been applied. That is, the material feeding device 14 attracts the material 2 in the material tank 13 to a part of the surface 42a of the insulating layer 42.

The material feeding device 14 feeds the material 2 partially adhered to the surface 42a of the insulating layer 42 to a feeding region R1 at a feeding position P2. Accordingly, a layer of the material 2 corresponding to the shape of the electrode regions 51A of the attracting substrate 41 to which the positive current has been applied on the feeding region R1.

The three-dimensional printer 1 may melt the layer of the material 2 partially formed on the feeding region R1 by the optical device 16 or may further feed another material to the feeding region R1. For example, the material feeding device 14 applies a positive current to the electrode regions 51B at a position where the surface 42a of the insulating layer 42 faces another material. Accordingly, the other material is attracted to the surface 42a of the insulating layer 42 by the Coulomb force (an attracting force) at positions corresponding to the electrode regions 51B. A layer of the material 2 and the other material is formed on the surface 42a of the insulating layer 42. The material feeding device 14 feeds the material 2 and the other material adhered to the surface 42a of the insulating layer 42 to the feeding region R1 to form a layer of the material 2 and the other material on the feeding region R1.

In the three-dimensional printer 1 of the fourth embodiment, the material feeding device 14 applies current to some of the electrode regions 51 to attract the material 2 to a part of the surface 42a of the insulating layer 42. Accordingly, the material feeding device 14 can partially feed the material 2 to the feeding region R1 and form the layer of the material 2 by the plurality kind of particles of the material 2 on the feeding region R1.

In the fourth embodiment, the electrode regions 51 are provide at a pitch of several tens μm. However, the electrode regions 51 are not limited thereto, and may be, for example, relatively large regions formed by dividing the attracting substrate 41 into a plurality of regions.

According to at least one of the embodiments described above, the feeding unit includes the electrode unit which is electrically chargeable by application of voltage thereto and the insulating unit which covers the electrode unit, and the electrode unit is capable of attracting the powdered material to the surface of the insulating unit or separating the material from the surface of the insulating unit by control of a charged state thereof. Accordingly, the feeding time of the powdered material is reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, in the above embodiments, the three-dimensional printer 1 manufactures the manufactured object 3 by melting the material 2 using laser light L. However, the three-dimensional printer 1 is not limited thereto, and the three-dimensional printer 1 may manufacture the manufactured object 3 by, for example, feeding a bonding agent (binder) to the material 2 by ink jet to partially solidify the material 2. In this case, the material 2 is not limited to metal, and may be another material such as a synthetic resin.

In the above embodiments, the three-dimensional printer 1 uses the laser light L as an energy ray for melting the material 2. However, the energy ray may be any ray capable of melting the material as performed by the laser light L, and may be an electron beam or an electromagnetic wave in the range from a microwave to an ultraviolet ray.

The invention claimed is:

1. An additive manufacturing apparatus comprising:
a housing configured to store a material;
an electrode feeder comprising an electrode which is electrically chargeable and an insulator covering the electrode, the electrode being configured to attract and separate the material to and from a surface of the insulator based on a charged state of the electrode;
a region configured to be fed with the material;
an electrode feeder driver configured to change a relative position between the electrode feeder and the region;
a laser oscillator configured to emit a laser light;
an optical element configured to apply the laser light on a predetermined position of the region; and
a controller configured to determine the predetermined position based on cross-sectional shape data generated from three-dimensional data of a manufactured object, wherein
the region is grounded such that the material fed onto the region exhibits zero charge.

2. The additive manufacturing apparatus according to claim 1, further comprising a charger configured to apply a positive or negative charge to the material in the housing.

3. The additive manufacturing apparatus according to claim 2, wherein the electrode feeder is configured to separate the material from the surface of the insulator by applying a voltage having the same polarity as the charge applied to the material to the electrode.

4. The additive manufacturing apparatus according to claim 1, further comprising a heater configured to heat the surface of the insulator.

5. The additive manufacturing apparatus according to claim 4, wherein
the heater is disposed inside the electrode.

6. The additive manufacturing apparatus according to claim 1, wherein the electrode feeder driver is configured to allow the electrode feeder to pass through a position that faces the material exposed in the housing to attract the material to the surface of the insulator.

7. The additive manufacturing apparatus according to claim 1, wherein the material in the housing is powdered and the additive manufacturing apparatus further comprises a squeegee configured to smooth the material.

8. The additive manufacturing apparatus according to claim 1, wherein the electrode includes a plurality of electrode regions each electrically chargeable and is configured to attract the material to a part of the surface of the insulator by application of voltage to the electrode regions, individually.

9. The additive manufacturing apparatus according to claim 1, wherein
the electrode feeder is configured to adjust a thickness of a layer of the material adhered to the surface of the insulator by adjusting the charged state of the electrode.

10. The additive manufacturing apparatus according to claim 1, wherein
the surface of the insulator of the electrode feeder is configured to press the material fed to the region to thicken the material after feeding the material.

* * * * *